United States Patent [19]

Takeuchi et al.

[11] 4,122,392
[45] Oct. 24, 1978

[54] SYSTEM OF DETECTING A CHANGE IN THE CHARGE PUT IN A METALLURGICAL FURNACE OR THE LIKE

[75] Inventors: Shinjiro Takeuchi, Toda; Tosiro Kikuchi, Urawa; Koosuke Harada, Fukuoka; Tokuji Shokyu; Yoshihiro Fujii, both of Sakai, all of Japan

[73] Assignees: Nippon Steel Corporation, Tokyo; Mishima Kosan Co. Ltd., Kitakyushu, both of Japan

[21] Appl. No.: 714,788

[22] Filed: Aug. 16, 1976

[30] Foreign Application Priority Data

Aug. 20, 1975 [JP] Japan ................... 50-100995
Aug. 20, 1975 [JP] Japan ................... 50-10996

[51] Int. Cl.² ............................... G01R 33/12
[52] U.S. Cl. ............................ 324/208; 266/92; 75/41
[58] Field of Search ............. 324/34 R, 34 D, 34 PS, 324/40, 41, 43 R, 207, 208; 266/92, 93, 90; 75/60, 41

[56] References Cited

U.S. PATENT DOCUMENTS

| 2,662,996 | 12/1953 | Martin ..................... 324/34 R |
| 2,971,151 | 2/1961 | Mierendorf et al. ............ 324/41 |
| 2,994,034 | 7/1961 | Kinzer ........................ 324/41 |
| 3,239,826 | 3/1966 | Yetter ...................... 324/43 R |
| 3,364,012 | 1/1968 | Noel ............................. 75/41 |
| 3,436,649 | 4/1969 | Takechi et al. ................ 324/41 |
| 3,581,070 | 5/1971 | Tsujihata et al. .............. 266/92 |
| 3,588,067 | 6/1971 | Shimotsuma et al. ............ 266/92 |
| 3,942,105 | 3/1976 | Bondarenko et al. .......... 324/34 R |
| 4,006,408 | 2/1977 | Sagisaki et al. ............. 324/43 R |
| 4,027,233 | 5/1977 | Shmakov et al. ............. 324/34 R |

FOREIGN PATENT DOCUMENTS

| 1,293,177 | 4/1969 | Fed. Rep. of Germany ......... 75/41 |
| 909,023 | 10/1962 | United Kingdom ............. 324/41 |
| 1,079,991 | 8/1967 | United Kingdom .......... 331/113.1 |
| 153,787 | 10/1961 | U.S.S.R. ..................... 324/40 |

OTHER PUBLICATIONS

Japanese Published Application 3,570-1973; Jan. 17, 1973.
Johnson, Paul D.; Operating Experience with the Nuclear Ray Blast Furnace Stock Gage; Iron & Steel Eng.; Aug. 1960, pp. 168-169.

Primary Examiner—Robert J. Corcoran

[57] ABSTRACT

A system of detecting a change in the charge put in a metallurgical furnace or the like wherein an magnetic field generator and a magnetic sensing section of a magnetometer arranged along the central axis of the exciting magnetic field of the said magnetic field generator are fitted in place on and/or inserted into a hole of the wall of such a vessel, including a metallurgical furnace or the like, as is enclosed with the said wall, such a change in the exciting magnetic flux passing through the said magnetic sensing section as is given birth by the movement of the charge is picked up in the form of electrical signals, and, the movement, the velocity, the rate of travel, the thickness of the layer, fluctuations in the shape of the layer, the circumferential distribution, the classification, and so forth, of the said charge are enabled to be properly detected in an optional manner through corresponding changes in the said electrical signals.

14 Claims, 18 Drawing Figures

SYSTEM OF DETECTING A CHANGE IN THE CHARGE PUT IN A METALLURGICAL FURNACE OR THE LIKE

BACKGROUND OF THE INVENTION:

1. Field of the Invention:

The present invention relates to a system of detecting such behaviors of a charge as are difficult to be detected from outside of a metallurgical furnace or the like, including the movement, the rate of travel, fluctuations in the shape of the layer, and the like, of the charge put in the metallurgical furnace or the like.

2. Description of the Prior Art:

Generally, in the case of a furnace, typically a vertical metallurgical furnace like a blast furnace, ores, sintered ores, limestone, coke, and so forth are charged in the shape of layers in a sequential manner from the top of the furnace, then hot air and fuel are blown into the furnace from the lower portion thereof, to thus conduct refining. In such a case as this, it is quite important for conducting refining control of the furnace in a smooth manner to detect how the charge put in place from the top travels in the furnace, of what degree the rate of its travel is, what the distribution of its layers is like, and how the said distribution of the layers is subjected to fluctuations. However, the said behaviors of the charge has never been detected correctly enough, due to the reality that the said furnace is a sealed structure covered thick with refractory or steel and refining is conducted in quite high temperature. In the conventional practice, such a means as observes through television the shape of distribution of the surface layer of a charge at the top of the furnace, and such a means as learns the behaviors of a charge through detecting distribution of temperature or distribution of gases at the top of the furnace, have been developed and employed for the practical purpose, in an effort of learning the said behaviors of a charge. However, neither one of the said means can conduct proper detection of the behaviors of a charge below the stock line of the furnace. Therefore, control of reaction of the furnace by making use of the results of detection has been anything but high enough in terms of the precision thereof. In order to overcome the defect of insufficient precision of the above-mentioned indirect means of detection, such a means as learns the behaviors of a charge by detecting the magnetic force borne in ores by the use of a magnetic sensor has been contrived. One example of this category of means is disclosed in details in the Japanese Laid-Open Patent Gazette, No. 3,570-1973. The said method is such that a magnetoelectricity transducer element, a magnetometer, and a gaussmeter, well known as magnetic sensors, are arranged on the wall of the furnace, to thus detect the magnetic force generated from ores themselves and movement of a charge put in the furnace, also fluctuations in the state of distribution thereof, are to be detected through fluctuations in the magnetic force of ores formed by the movement of the charge thereof. However, this method is influenced a great deal by residual magnetism of the steel cover surrounding the furnace and by terrestrial magnesium, which makes it difficult to detect the magnetic force of ores, selected as an object of detection, in a manner of being separated from the said residual magnetism of the steel cover and the said terrestrial magnesium.

SUMMARY OF THE INVENTION

An object of the present invention is to provide a system of detecting the behaviors of a charge put in a metallurgical furnace, by the employment of such magnetic sensors as are provided with an magnetic fluid generator, respectively.

Another object of the present invention is to provide a system of obtaining quantitative information with regard to the behaviors of a charge put in a metallurgical furnace, by the employment of such magnetic sensors as are provided with an magnetic field generator respectively.

According to the present invention, there is provided a system for detecting a change in a charge or charges put in a furnace such as a metallurgical furnace, including an magnetic field generator and magnetic sensor in combination. The magnetic sensor has the magnetic sensor section of the magnetometer along the central axis of the exciting magentic field of the magnetic fluid generator. The magnetic field generator and the magnetic sensor are provided in place on the wall of the furnace. Preferably, they are inserted into a hole of the wall of the furnace.

Preferably, there are provided a plurality of magentic sensors which are arranged in place on the wall of the furnace in the circumferential directions and in the vertical directions. Also, there are provided a signal treatment circuit for conducting proper treatment of an output signal transmitted by the magnetic sensor and a circuit for recording or indicating the output of the signal treatment circuit. A fluctuation in the magnetic flux passing through the said magnetic sensing section, due to the movement of the charge, is picked up in the form of an electrical signal, and subjected to arithmetic treatment. In addition thereto, the said magnetic sensors are preferably so designed as to be of the cooling system. Thereby, the behaviors of a charge in the high-temperature state are likewise enabled to be detected in a proper manner. The said magnetic sensing section is preferably arranged in place in the vacinity of the forward end near the charge, of the magnetic fluid generator that magnetizes the charge, and fluctuations in the constituents of the vector in the exciting magnetic field in the direction of the magnetism detecting axis of the magnetic sensing section that is subjected to fluctuations by the charge traveling in the vicinity of the magnetic sensing section are detected, to thus keep the charge free from being influenced by the surrounding noise magnetic field by making this strong artificial magnetic exciting field of said magnetic field generator, thereby enabling the behaviors of the charge to be detected with sufficient precision.

DESCRIPTION OF THE PREFERRED EMBODIMENTS:

A method of measuring the properties of an object of measurement (hereinafter referred to as the object in a simplified term), the distance to the object, and the fluctuations in the distance, by the employment of various kinds of magnetometers, has been generally known. However, what has been manifest is such a method whereby the intrinsic magnetism of the object is measured in the original state thereof or the residual magnetism of the object after magnetization is detected directly by the employment of a magnetometer. For this reason, the said methods have such an inherent defect that either some has a limit in terms of the sensitivity thereof or some is prone to be influenced by the noise magnetic field even if in case sufficient sensitivity can be obtained.

According to the present invention, the magnetic sensing section of a magnetometer is arranged in place in the vicinity of the forward end of an magnetic field generator, to put it otherwise, at such a position as is selected along the central axis of the exciting magnetic field of the said magnetic field generator. Thereby, in case the object of measurement, that is to say, a charge, is present within the said exciting magnetic field, or in case the charge comes penetrating into the said exciting magnetic field, or in case the charge escapes to the outside of the exciting magnetic field from the inside of the said exciting magnetic field, such a fluctuation in the exciting magnetic flux density, passing through the said magnetic sensing section, as is caused to be formed in a manner corresponding to each case to be checked, and, on the basis thereof, the distance to the object of measurement, fluctuations in the distance, and/or the properties (sorts of charges) of the object of measurement are measured.

Next, an additional description will be given below with regard to the said detection of the distance, fluctuations in the distance, and the properties of the object of measurement, that is to say, a charge. In the case of the present invention, the "distance" has a meaning not of an absolute value but of a relative value. This is likewise true to the case of the said fluctuation in the distance. However, in the case where a couple of magnetic sensors are employed in the vertical directions, including the upward direction and the downward direction, the absolute value of velocity of the object and that of the thickness of a layer can be calculated on the basis of the separating distance between the both magnetic sensors and the phase difference of electric signals detected by the said both magnetic sensors. Besides, as to the said meaning of the properties, now that a difference arises in terms of the permeability of charge, depending on whether the charge is a non-magnetic substance or a ferromagnetic substance, that is to say, the properties of the said charge with relation to the permeability thereof, and in case the density does not remain constant, although the sort of the charge remains the same and constant, it has a connotation to the effect that the properties of the charge with regard to the density thereof can be learned. Furthermore, it ought to be understood that the range of the said exciting magnetic field is nothing specifically delineated with theoretical precision, but what designates the magnetic field in the measuring range of a magnetometer as far as the object of the present invention is concerned.

Now, as set forth in the preceding paragraphs, the present invention relates to such a method as is applicable for detecting the fluctuations in the density of such exciting magnetic flux as passes through the magnetic sensing section, to put it otherwise, the fluctuations that is caused to arise by the movement of an object substance of measurement, and has constituent arranged in the direction of the magnetism detecting axis of the magnetic sensing section in the exciting magnetic field. Therefore, the method features a high level of sensitivity and only a negligible degree of being influenced by the surrounding magnetic field. For this reason, the method according to the present invention is claimable to have an advantage that the precision of detection is quite high. Another feature of the present invention rests with that fluctuations in a powerful exciting magnetic field itself are measured, which proves effective enough for detecting an object of measurement having quite low permeability. For this reason, even such a category of material of which the value of the residual magnetic flux is near to zero can be measured in a proper manner.

Figure 1:
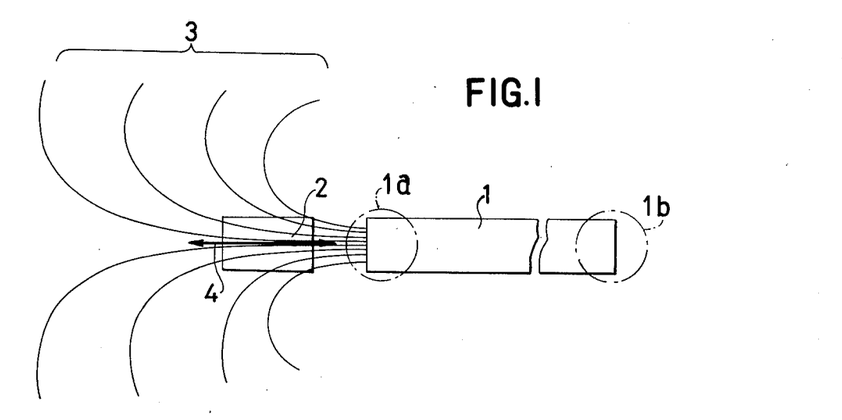
FIG. 1 is a diagram to show the positional relation between the exciting magnetic field and the magnetic sensing section introduced in the present invention.

Next, given below will be a detailed description of the principle of detection by the application of the method according to the present invention, by making reference to the drawings attached hereto. FIG. 1 is a diagram of the basic construction, showing the interrelation among an magnetic field generator 1, such an exciting magnetic field as is given birth by the magnetic field generator, and a magnetic sensing section 2 of a magnetometer, in case no objects of measurement are present. As shown in FIG. 1, the magnetic sensing section 2 has the direction of the magnetism detecting axis 4 thereof arranged along the central axis of the magnetic fluid generator 1, for the purpose of detecting fluctuations in the density of an exciting magnetic flux 3 in the vacinity of a forward end 1a of the magnetic field generator 1, the forward end 1a is an end positioned closer to the charge within the furnace, and the magnetic field generator has a rearward end 1b positioned at a remote side from the charge. And, it is desirable that the magnetometer to be selected for use is of such a characteristic as is kept free from being saturated by the exciting magnetic field to be applied on the magnetic sensing section.

Figure 2:
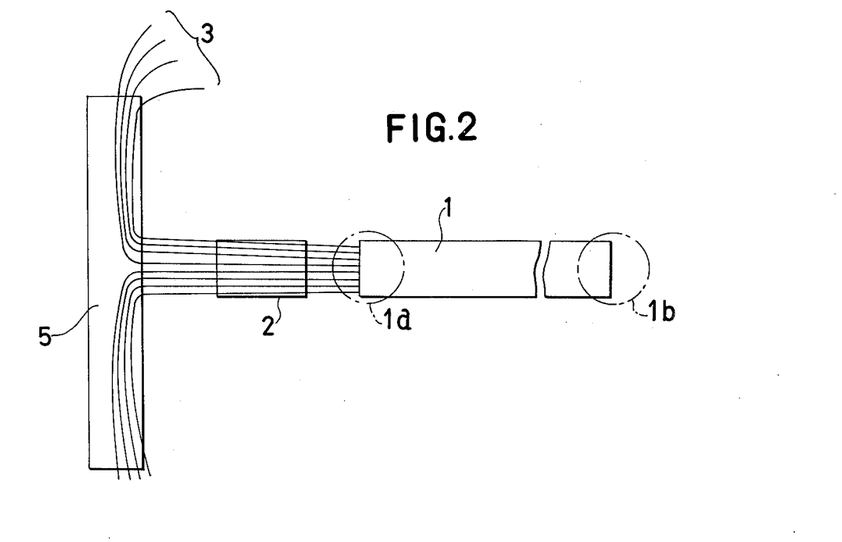
FIG. 2 is a diagram of the state of magnetic flux concentrated by an object substance of measurement having high permeability.

FIG. 2 is a drawing of distribution of the exciting magnetic flux, showing fluctuations in the exciting magnetic field, in case an object of measurement having a high level of permeability is present in the said exciting magagentic field. As a highly permeable substance 5 draws near to the magnetic field generator 1 and the central axis thereof, the exciting magnetic flux 3 given birth by the magnetic field generator 1 is focused in such a manner as is shown in FIG. 2. In this case, the magnetic flux density in the magnetic sensing section 2 and its vicinity becomes considerably high, compared with the case shown in FIG. 1, as shown in FIG. 2. Such a fluctuation in the magnetic flux density like this enables the permeability of the said object of measurement to be measured in a proper manner, in case a measured value is related to the value of permeability of a known substance specifically selected as a criterion thereof in advance. Beside the density of an object of measurement, for instance, the real density of the substance itself, and the degree of filling, in case the object of measurement is a lump, a particle, or a powdered substance, the quantity and the shape thereof can be likewise measured, as set forth above, by contriving a proper method of detection. To add up thereto, distance between the object of measurement and the magnetic sensor, also distance of travel of the object of measurement, can likewise be measured, as set forth above. This sort of measurement by the application of the method introduced in the present invention proves especially effective, when such a physical barrier as a nonmagnetic wall or film, or other obstacle, including a high-temperature and harmful gas or liquid, is present between an object of measurement and the exciter, and/or between an object of measurement and the magnetic sensing section, or when an operator cannot make access in a safe manner, and there is needs to conduct remove-controlled measurements.

Figure 3:
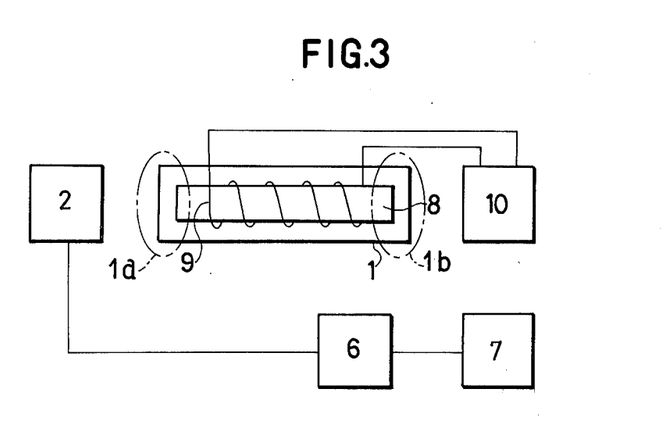
FIG. 3 is a block diagram of the basic circuits of the magnetic sensor employed in one illustration for materializing the method introduced in the present invention.

FIG. 3 is a block diagram showing a basic circuit of such an apparatus as is employed for materializing the method introduced in the present invention. The magnetic fluid generator 1 has a coil 9 wound around a magnetic core 8 in the shape thereof. The magnetic fluid generator 1 is connected with a power source 10 of either AC or DC. 6 is a driving circuit section that drives the magnetic sensing section 2, 7 is a signal treatment circuit section. What is termed a magnetometer in the present invention basically comprises the magnetic sensing section 2, the driving circuit section 6 and the signal treatment circuit section 7, and an output signal generated is subjected to proper treatment by the manifest signal processing technology in the signal treatment circuit section 7 in a manner of corresponding to the wave-form of the output signal. In this case, memory of the signal, and such other functions as comparison, arithmetic operation and manifestation of the signal are conducted, wherever so required. It might as well be added that designing can be conducted in a free manner, for instance, the output signal level of the magnetometer at the time no object of measurement is present at all can be selected as the standard level, or the said output signal level can be so controlled as to be lowered down to the level of zero through the signal treatment circuit section 7.

Figure 4:
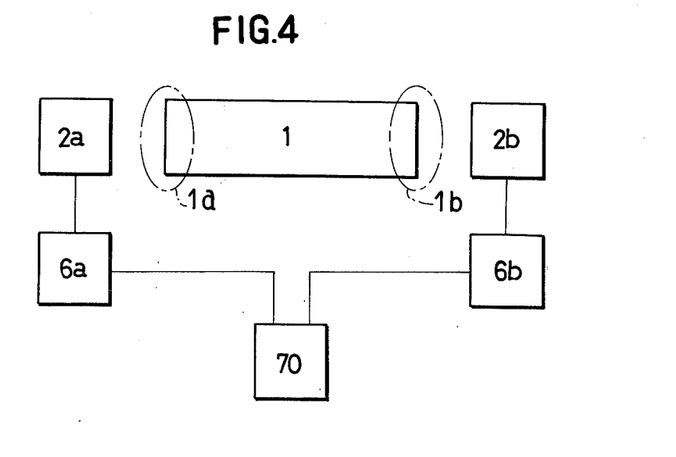
FIG. 4 is a diagram of the basic principle of a differential magnetic sensor employed in one illustration for materializing the method introduced in the present invention.

Next, the basic principle of the differential type will be described by making reference to FIG. 4.

A couple of magnetic sensing sections 2a, 2b are arranged at the forward end and the rearward end of the magnetic fluid generator 1, respectively. The magnetic sensing sections 2a, 2b are respectively connected in an electrically differential manner with a signal treatment circuit 70 by way of driving circuits 6a, 6b. Thereby, such a magnetic field like terrestrial magnetism as is applied further on the said exciting magnetic field as a noise magnetic field i.e. back ground field, that is to say, a parallel magnetic field, can be properly checked from exercising its influence. The properties of an object of measurement, the distance of, and fluctuations in the same, can thus be properly measured by the magnetic sensing section 2a in main, referring to FIG. 8.

The basic principle on which the present invention is contrived is as set forth above. Therefore, behaviors of a charge put in a metallurgical furnace or the like, which have thus far been quite difficult to be learned, are enabled to be detected in a proper and accurate manner. A detailed description will be given below, as to the materialized working of the present invention, by selecting and introducing one illustration wherein the present invention is applied to a blast furnace.

Figure 5:
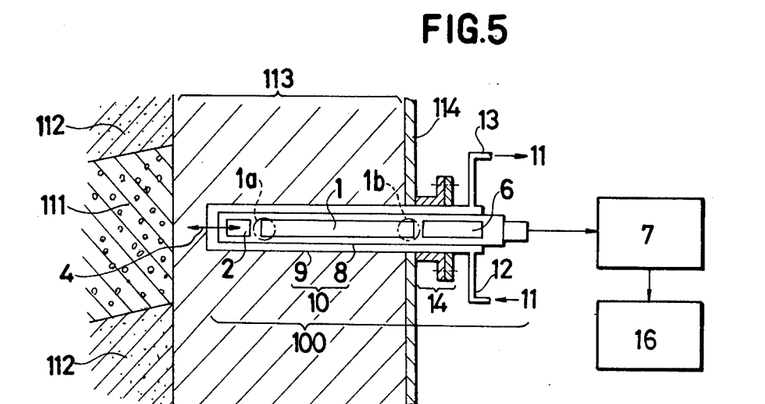
FIG. 5 is an outlined diagram to show the mounting, the construction, and the functions of the magnetic sensor employed for materializing the method introduced in the present invention.

Shown in FIG. 5 is an example wherein the method introduced in the present invention is applied as one illustration. 111 is iron ore charged into a blast furnace. 112 is coke. As well known, as the blast furnace is put in operation, the charge that is to say, the said iron ore (including sintered ore) 111 staying in a shaft section falls downward together with the coke. The speed of fall and the thickness of the layer thereof change moment by moment. Now that the changes thereof in the vertical directions and in the circumferential directions within a furnace are not uniform, reactions in the furnace are subjected to changes accordingly. In order to maintain the normal reactions in the furnace, it is imperative to make proper selection of the quantity of a charge, the position for charging, and the timing for charging, with thorough knowledge of the movement of the said charge, in other words, transfer of its position, speed of its travel, fluctuations in its level, fluctuations in its density, whether or not iron ore 111 is present at a proper position corresponding to the specific measuring position, whether or not coke 112 is present, and in what manner the said items change their positions. Now that a metallurgical furnace, such as a blast furnace or the like, is generally constructed of a thick refractory wall, and, furthermore, is high in temperature, it is nothing easy to learn the transfer of the position of a charge. To remedy such a situation, the present invention is what is specifically contrived in an effort of providing a proper method well serviceable for grasping the said transfer in a correct manner.

As shown in FIG. 5, the magnetic sensor 100 is inserted into a hole drilled through a sheet iron shell 114 and a brick wall 113 of a furnace in the direction of the core of the furnace. The magnetic sensor 100 has a magnetic sensing section 2 fitted in place on the top thereof, an magnetic fluid generator 1 fitted in place on a portion adjoining thereto, is acompanied with such a driving circuit 6 as drives the magnetic sensing section 2, and arranged in the rear of the magnetic field generaor, and, furthermore, comprises an internal case 8 for containing the said items, an external case 9 having an interstice for a coolant to pass through properly formed between itself and the said internal case 8, and having the said internal case 8 enclosed therein, a feed pipe 12 for a coolant 11, a coolant discharge pipe 13, and a fitting apparatus 14 for fitting a steel cover, for instance, a flange-shaped fitting.

Shown in FIG. 5 is simply one illustration; therefore, the constitution shown therein is not limitative but may be subjected to modification properly in terms of its design, as far as such is kept free from deviating from the scope of the object of the present invention. To put it in concrete terms, such an angle as is made by the direction of the magnetism detection axis 4 of the magnetic sensing section 2 and the direction of the core of the furnace, and such an angle as is made by the said direction of the magnetism detection axis 4 and the axial direction of the exciting magnetic field of the magnetic field generator 1, are not limitative; besides, such a design wherein the driving circuit 6 is incorporated with the magnetic sensing section 2 at the position of the latter, or the said driving circuit 6 is taken outside a protective case 10 for the arrangement thereof, may be acceptable, wherever such is required by the case. Now, with regard to the coolant, either such a well-known gaseous coolant as air, nitrogen, or the like, or such a liquid coolant as water, oil, or other cooling agent, is to be properly employed to best suit the temperature of the wall of the furnace and the peripheral environments.

In the case of this illustration, introduced is such a measure wherein a coolant 11 is employed; however, this measure is what is to be employed in case the metallurgical furnace is of a high level in terms of the temperature thereof; therefore, in case the temperature of the metallurgical furnace or the like is comparatively low, the above-mentioned cooling measure need not be specifically employed; however, now that, in general practice, a metallurgical furnace or the like is high in temperature in many cases, and a portion of comparatively low temperature becomes high in temperature transiently due to fluctuations in the conditions of operation, it is still advisable that some proper forced cooling measure be employed.

Next, 7 is a signal treatment circuit for conducting proper treatment of an output signal transmitted by the magnetic sensor 100 by the employment of a well-known signal treatment measure, including, for instance, a measure of amplification or a measure of waveform shaping; however, in some case, this signal treatment circuit is omitted, hence not specifically employed, depending on the state and the conditions of the said output signal. 16 is an indicator circuit designed for recording or indicating an output of the driving circuit 6 or an output of the signal treatment circuit 7. In the present invention, the signal treatment circuit 7 and/or the indicator circuit 16 are/is termed signal treatment devices/a signal treatment device.

Now, in FIG. 5, when the iron ore 111 and the coke 112 fall downward in the vicinity of the top of the magnetic sensor 100, such results in falling in such an exciting magentic field as is generated by the magnetic field generator 1; therefore, the constituents of the vector in the exciting magnetic field of the magnetic sensing section 2, in the direction of the magnetism detection axis 4, are subjected to fluctuations. So, when the fluctuations in the said constituents of the vector are detected by the magnetic sensing section 2, and the signals thereof are fed on the said indicator circuit 16 by way of the signal treatment circuit 7, as an input, behaviors of a charge can be grasped and learned in a correct and accurate manner.

Next, a detailed description of the signal treatment conducted in the case of an illustration of the present invention will be given below, by making reference to FIG. 6.

Figure 6:
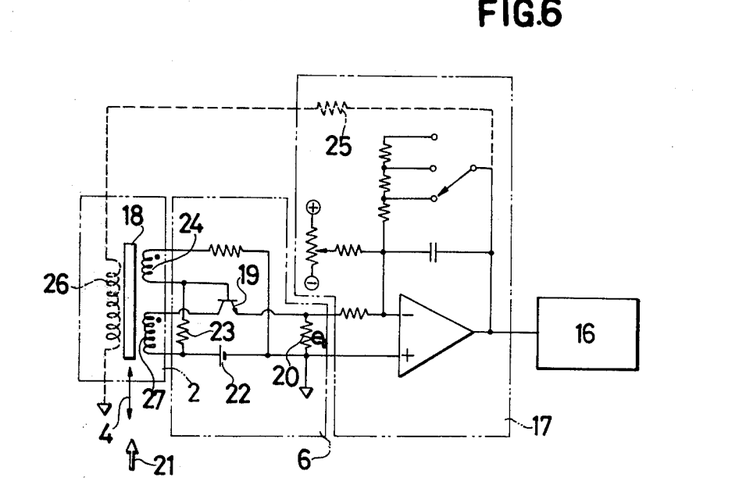
FIG. 6 is a detail circuit of a magnetometer introduced in the present invention.

Shown in FIG. 6 are a single transistor type magnetic oscillation magnetometer. 2 is a magnetic sensing section, and 6 is a driving circuit. Switching on and switching-off of the magnetic core 18 and a switching transistor 19 are caused to be conducted by virtue of the non-linear characteristic of the magnetic core 18, and a magnetic field 21 to be applied on the magnetic core 18 is detected by the terminal voltage $e_0$ of such a dummy resistor 20 as is inserted into the said circuit.

Next, with regard to the action of this circuit, the level of the magnetic flux of the magnetic core 18 is controlled by the external magnetic field 21. Now, when a DC power source 22 is thrown in, an electric current runs by the route of the DC power source 22 → a resistor 23 → the switching transistor 19 → the dummy resistor 20 → the DC power source. Thereby the switching transistor 19 starts its conduction, and a collector current runs through an exciting coil 27, to thus conduct excitation of the magnetic core 18, whereby a coil 24 has induced voltage generated therein, as a result thereof, the base current of the switching transistor 19 increases, and the switching transistor 19 becomes thoroughly conductive. However, now that the magnetic core 18 is of the non-linear characteristic, the time differentiation value of the magnetic flux is subjected to reduction in a gradual manner, as the collector current increases in value, the induced voltage in the coil 24 becomes low in value, the collector current of the switching transistor 19 reduces in an abrupt manner, and the switching transistor 19 thus becomes nonconductive in the end. As a result thereof, the level of the magnetic flux of the magnetic core 18 returns to the initial level of the magnetic flux. By repeating the above-mentioned cycle in a periodic manner, the direct current mean voltage of the terminal voltage $e_0$ is caused to be properly controlled by the fluctuations in the magnetic field 21. The resistor 25 and the coil 26 are what are required in the case of constituting a negative feedback circuit system for erasing the magnetic field 21 to be applied on the magnetic core 18 for the purpose of extending the measuring range.

Figure 7:
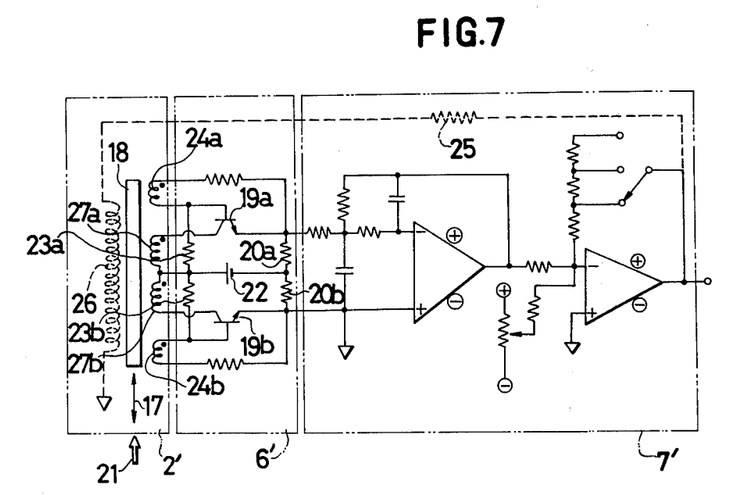
FIG. 7 is another detail circuit of the magnetometer employed for materializing the method introduced in the present invention.

Shown in FIG. 7 is a diagram of a magnetometer using a magnetic multi-sensor constituted by the combination of a couple of the magnetic oscillator circuit shown in FIG. 6. This magnetometer has its features in that the linearity of the input-output characteristics thereof is far superior to that of the single transistor type magnetometer, shown in FIG. 6, and that the said magnetometer has a super push-pull characteristic. A description of the performance of the said circuit will be given in details by making reference to the drawing. In FIG. 7, numerals of 2', 6' and 7' respectively correspond to magnetic sensing section, driving circuit section and signal treatment circuit section. Now, suppose first that an electric current runs by the route of the DC power source 22 → the resistor 23a → the switching transistor 19a → the dummy resistor 20a → the DC power source 22, the collector current of the switching transistor 19a runs into the collector of the switching transistor 19a runs into the collector of the switching transistor 19a from the DC power source 22 by way of a coil 27a. On this occasion, the coil 24a has induced voltage generated therein, and the switching transistor 19a becomes thoroughly conductive. The switching transistor 19b, on the part thereof, becomes inconductive, due to the induced voltage generated in the coil 24b. However, now that the magnetic core 18 has a non-linear magnetizing characteristic, the induced voltage of the coil 24a and that of the coil 24b drop, until the switching transistor 19a becomes non-conductive, and the level of the magnetic flux of the magnetic core 18 returns to such a level of magnetic flux as is regulated by the external magnetic field 21. On this occasion, the coil 24b has induced voltage of reverse polarity generated therein, whereby the switching transistor 19b becomes conductive for the same reason as that set forth in the preceding paragraph. The deviation of the direct current mean voltage of the terminal voltage of the dummy resistors 20a, 20b, is thus subjected to proper control by the magnetic field 21. The resistor 25 and the coil 26 are to be employed for the same purpose as in the case of the description given as to the magnetometer shown in FIG. 6.

In the case of the present invention, any device of such a category as employs a well-known flux gate magnetometer, a Hall element, an SMD (magnetism-sensitive semiconductor element) magnetic resistor element, or either one of multifarious search coils, not always limited to the above-mentioned magnetometer, can be selected for employment at liberty, as far as the device is such a magnetic sensor as is provided with an exciter and the magnetic sensing section of a magnetometer arranged virtually along the central axis of the exciting magnetic field generated by the said magnetic field generator, and meets the requirements of the above-mentioned functions. However, still recommendable as the most suitable one for the use of a blast furnace is such a magnetic multi-sensor as is described in details in the preceding paragraph by making reference to FIG. 7.

Next, a detailed description will be given, with regard to the magnetic field generator 1. What is available for use as the magnetc field generator 1 includes the one constituted of an exciting coil, the one constituted of a combination of a magnetic core and an exciting coil, or the one constituted of a permanent magnet. In this case, the electric current to be caused to run through the exciting coil which forms to an exciting magnetic field may well be either a direct current or an alternating current. What is most simplified in design and most serviceable for the practical purpose, of all the ones described above, is an magnetic field generator of such a system that excites a charge only by a permanent magnet. Now, when the magnetic sensing section 2 has an exciting magnetic field applied thereon to such a level of intensity as is in the excess of that of a required level, the magnetometer is subjected to saturation in some case. Therefore, in case the exciting magnetic field to be applied on the magnetic sensing section is required to be erased for the purpose of actuating the magnetic sensing section within a desired dynamic range, it is recommendable that either an erasing coil be arranged in the periphery of the magnetic sensing section 2, or a magnetic of reverse polarity be arranged in the vicinity of the magnetic sensing section 2. With regard to the protective case 10 comprising the internal case 8, the external case 9, the coolant feed pipe 12, the coolant discharge pipe 13, and the fittings 14, wherever so required, the one made of a non-magnetic substance is to be preferably selected for use, as much as practicable. The non-magnetic substance well proving suitable for the practical purpose includes, for instance, stainless steel, copper, or the like.

Figure 8:
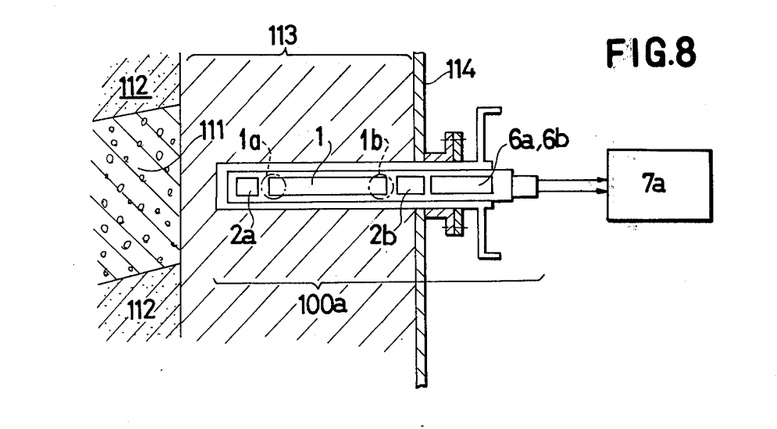
FIG. 8 is an outlined diagram of the mounting and the construction of the differential magnetic sensor employed for materializing the method introduced in the present invention.

FIG. 8 is an outlined block diagram of a magnetic sensor 100a wherein magnetic sensing sections 2a, 2b are arranged in the vicinity of the both ends 1a, 1b magnetic field generator 1, to thus cancel such parallel magnetic field constituents i.e. back ground field constituents as are applied from the periphery, and such a differential type magnetic sensor for the use of a blast furnace as is suitable for detecting the behaviors of iron ore 111 or coke 112 only in the portion adjacent to the wall of the furnace is specifically employed. 6a, 6b are driving circuits for the magnetic sensing sections 2a, 2b, and the driving circuits are subjected to differential connection with the signal treatment circuit 7a. In the case of this illustration, the range of sensing the behaviors of a charge can be changed by changing the length of the magnetic field generator 1 and the distance between the magnetic sensing sections 2a and 2b.

Figure 9:
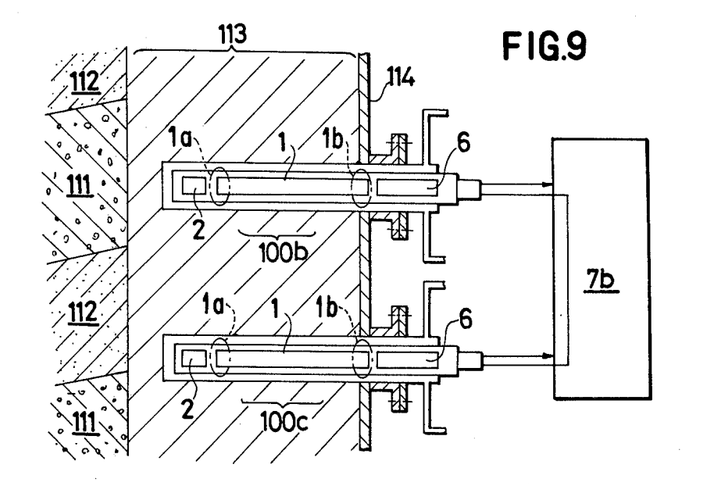
FIG. 9 is an outlined diagram of the mounting, the construction, and the actuation of the magnetometer, in the case of employing a couple of magnetic sensors arranged in a vertical manner.

Next, FIG. 9 is an outlined block diagram of such a differential connection type measure wherein a couple of the magnetometer for the use of a blast furnace and shown in FIG. 5 are arranged at an upper position and a lower position in the vertical directions, and the outputs of the respective magnetic sensors 100b, 100c are subjected to differential connection with the signal treatment circuit 7b, thereby enabling the fluctuations in charges, including iron ore 111 and coke 112, resulting from the fall of the said charges to be detected in a proper manner.

Figure 10A:
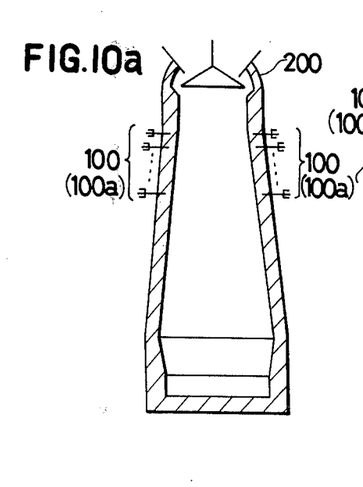
FIG. 10a and FIG. 10b are outlined diagrams of the mounting and the arrangement of the magnetic sensors arranged for a blast furnace.
Figure 10B:
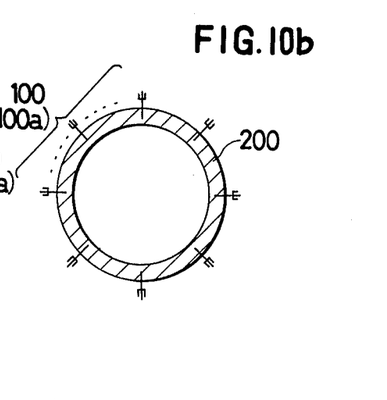

Shown in FIGS. 10a and 10b is an illustration of the method introduced in the present invention and applied for synthetically grasping the fluctuations in the charges selected for the use of a blast furnace in the vertical directions and the circumferential directions, as well as the behaviors of the said charges, wherein the wall of the blast furnace 200 has the said magnetic sensors 100 or 100a fitted in place in the horizontal directions (circumferential directions) and in the perpendicular directions (vertical directions), and, when the magnetic sensors are arranged in the vertical directions with designated spacing in such a manner as is shown in FIG. 10a, distribution in the vertical directions and vertical fluctuations in the behavior of the charges put in the blast furnace 200 can be grasped in a proper manner. When the magnetic sensors are arranged in the circumferential directions with designated spacing in such a manner as is shown in FIG. 10b, the level of distribution of the charges in the circumferential directions can be grasped in a proper manner. Furthermore, when the both of the said two types of arrangement shown in FIGS. 10a and 10b are combined in over lapping manner, the state of distribution and the behaviors of the charges in the vertical directions and in the circumferential directions can be detected in a proper and correct manner. In this case, what is required is that the output signals of a plurality of the above-mentioned magnetic sensors are fed to the signal processing unit as an input, then the results of comparison of the said output signals with one another, the results of comparison of the said output signals with a standard value, and the sum of, or the balance between, the values of the said signals, are subjected to arithmetic operation and indication in an optional manner. For instance, detection of whether or not some charge is present, comparison of a value learned attendant upon a fluctuation in the charge with an output signal, with the state of presence of no charges or a specific detected value of a certain charge specifically selected as a standard value therefor, detection of the classification and the travel of a charge, with the balance between the output signals of the upper and lower magnetic sensors specifically selected as a criterion therefor, can be conducted, respectively, and, distribution of a charge and a fluctuation therein as well can be learned by taking the sum of some certain specific group of signals generated by a plurality of magnetic sensors arranged in the circumferential direction as a guideline therefor.

Next, a description will be given below as to an example of making use of information obtained by the application of the method of detecting fluctuations in a charge, introduced in the present invention, to practical operation.

Now, to maintain a blast furnace in a favorable and effective state of operation, it is imperative that behaviors of the charges put in the furnace, including the state of distribution thereof and the state of fall thereof as well be grasped in a correct manner, and, in case the distribution and the fall are learned to be in the trend of turning unfavorable, pertinent and effective measures be taken for the modification and the correction thereof, for instance, change in the state of distribution of charges, change in the quantity of hot air to be lanced through a tuyere and/or that of heavy oil or other fuel blown in through a tuyere, and so forth. Now that a blast furnace is a hermetically sealed vessel and a high-temperature reaction vessel, it is quite difficult to learn the behaviors of the charges in the furnace in a correct and accurate manner. To remedy such a situation, some proposals have been made, including that fluctuations in the surface temperature distribution of charges in a blast furnace are detected from the top of the furnace by the employment of an industrial television system, and that magnetic sensors detecting the magnetic force generated from ores themselves are arranged on the wall of a blast furnace, to thus detect the distribution of charges in the furnace; however, each and every one the proposals is only capable at best of grasping the static state of charges; therefore, detection and control of dynamic behavior of charges in the fill layer thereof still remain to be contrived. As the production of iron and steel increases, the capacity of a blast furnace becomes colossal, nonuniformity of behaviors of charges, such as unequal fall of charges in a blast furnace in the circumferential direction, affects productivity in a serious manner, and fluctuations in the quality of pig iron are given birth by changes in reducing reaction resulting from the lack of uniformity, until the operation in the subsequent processes, including steel making processes, are influenced thereby.

The method according to the present invention is what can be utilized to cope with the above-mentioned situation in an effective manner; therefore, behaviors of charges, for instance, fluctuations in the thickness of the layers, difference therein, especially, the speed of fall and the state of distribution of the thickness of layers of charges are found by the employment of a magnetometer and by making use of the magnetic characteristics of the charges, thereby serving as a means of uniforming the speed of fall and as a means of ensuring the rationalization of the state of distribution of the charges in a manner of corresponding to the state of distribution of, and difference in, the speed of fall or the thickness of layers of charges and this method produces such a remarkable effect as cannot be expected of any conventional technology in the point that the reducing reaction in the furnace can be caused to be balanced, especially unbalance of the reducing reaction in the circumferential direction of the furnace is thereby corrected quickly enough, and the favorable and satisfactory state of operation of the furnace can be maintained.

Figure 11:
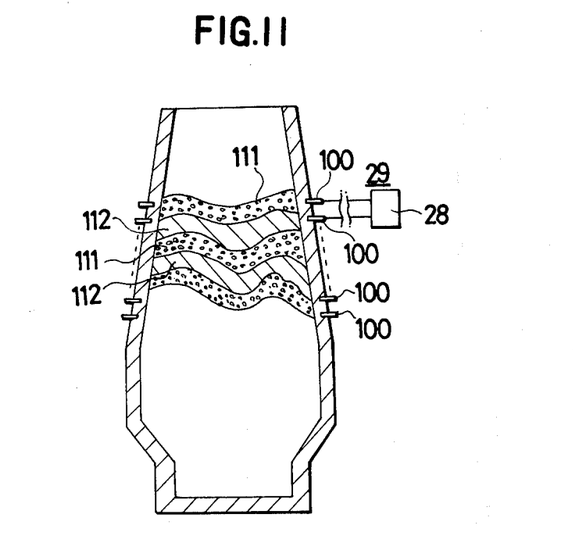
FIG. 11 is a diagram to show the state of use of the magnetometers employed for materializing the method introduced in the present invention.

Now, the magnetometer introduced in the present invention is constituted of a combination of a plurality of such magnetic sensors like 100, as shown in FIG. 11. The number of the magnetic sensors to be thus combined may well be in excess of two; however, combination of a couple of magnetic sensors proves sufficient. And indicated in FIG. 11 are the said magnetometer by the numerical symbol of 29.

Figure 12:
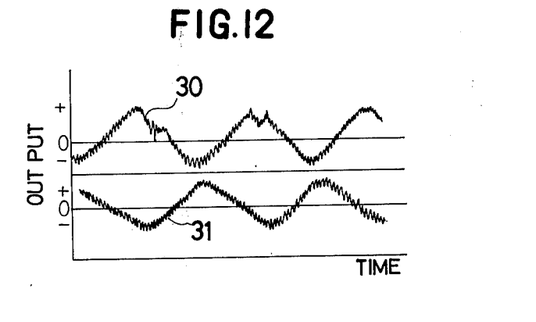
FIG. 12 is a graph showing the output waveforms obtained from the magnetometers employed for materializing the method introduced in the present invention.

With regard to the said magnetometers 29, an optional number thereof may well be combined into such a signal arithmetic unit (not shown in the drawing) wherein the magnetometers 29 are connected with an input signal treatment circuit 28. Now, in the case of the present invention, when such a signal as is obtained by burying the magnetic sensors 100 in the furnace wall bricks is subjected to shaping and amplification by the input signal treatment circuit 28, and displayed on an indicator, such as a recording meter or a picture tube, not shown in the drawing, then waveforms 30, 31 are obtained as shown in FIG. 12. The waveforms 30, 31 are output waveforms obtained from the upper magnetic sensor 100 and the lower magnetic sensor 100, respectively, whereof the axis of abscissa represents time, and the axis of ordinate represents output voltage of magnetometer The output is so changed as to be on the side of plus (+) at the time the iron ore 111 reaches the designated positions of the magnetic sensors 100, meanwhile, the output is so changed as to be on the side of minus (−) at the time a non-magnetic substance 112 like coke reaches the designated position. When the charges, including the said iron ore 111 and the said coke 112, fall without being subjected to a change in terms of the state thereof, the waveforms 30, 31 ought to come virtually similar to each other. In this case, the speed of fall can be learned by finding the phase difference of respective peaks of the waveforms 30, 31, for instance; however, in practice, the waveform 30 becomes fairly different from the waveform 31 in terms of local speed of fall, mixing of charges with each other, local difference in friction between the charges and the furnace wall bricks, and/or the like. For this reason, the speed of fall of the charges cannot be calculated simply enough by comparing the both waveforms 30, 31 and finding phase difference of the both. Such being the situation, the present inventors attempted to find the mutual interrelation between the two waveforms 30, 31, and succeeded in measuring the phase difference time. To put it otherwise, in this case, the outputs of the said waveforms 30, 31 are subjected to arithmetic operation by the application of the equation (1) given below:

$$g(\tau) = \int_0^T f_1(t) \cdot f_2(t - \tau)dt \quad (1)$$

Figure 13:
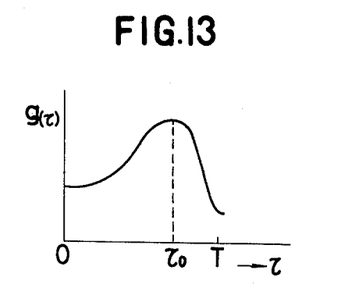
FIG. 13 is a graph showing the correlation function.

Here, $g(\tau)$ : Mutual correlation function
$f_1$ : Output waveform at the upper magnetic sensor
$f_2$ : Output waveform at the lower magnetic sensor
$t$ : Time
$T$ : Correlating arithmetic operation time
$\tau$ : Correlating time variable Alterations of $g(\tau)$ obtained by arithmetic operation are as shown in FIG. 13. In FIG. 13, the value becomes maximum at the time of $\tau = \tau_o$; however, this $\tau_o$ gives the phase difference time between the output waveforms of the said both magnetic sensors. To put it otherwise, when the time $\tau_o$ required of the charges to fall in the distance between the couple of magnetic sensors is found in such a manner as set forth above, the velocity $v$ of fall of the charges can be found by the application of the following equation (2), since the value L of the distance between both magnetic sensors is learned in advance.

$$v = L\tau_o \quad (2)$$

Furthermore, in case the said waveforms are regular enough, phase difference time between the two waveforms can be found likewise by the employment of a Schmidt circuit, a zero-crossing detection circuit, or a peak detection circuit, each of which is well known. In case the velocity of fall is further found, the thickness of the layer of the iron ore and that of the coke can be found, respectively, by multiplying the velocity of fall by the interval base of the output waveform of the magnetic sensor.

Now, an optional number of unit magnetic sensors are kept arranged in the direction of the circumference of the furnace and/or in the direction of the height of the furnace in such a manner as is set forth above, with the level in the circumferential direction thereof set on one and the same level as much as practicable, fluctuations in, difference or nonuniformity of, the velocity of fall of the charges and the thickness of the layers thereof in the circumferential direction of the furnace at the same level of the blast furnace are/is found, and nonuniformity of reactions in the furnace and deterioration in reactions in the furnace in the circumferential direction of the furnace are assumed in an indirect manner from the said fluctuations, difference or nonuniformity, to thus conduct control; thereby it is confirmed that the said velocity of fall and the said thickness of layers thus assumed to be lacking in uniformity have a quite deep interrelation with the nonuniformity of the reactions in the furnace, and the furnace can be maintained in a favorable state by conducting proper control in such a manner as is corresponding to the fluctuations in, the difference or the nonuniformity of, the velocity of fall, or proper control for uniforming the velocity of fall and the thickness of the layers in the circumferential direction of the furnace.

Next, a detailed description will be given below, with regard to the control conducted in a concrete manner, by making reference to one illustration. Either the velocity of fall of each and every one of the charges, learned by the employment of an optional number of such magnetic sensors as are respectively arranged in the circumferential direction of the furnace in a manner set forth above and provided with an input signal processing circuit, is subjected to comparison with such a standard value as is empirically obtained in advance, or all the levels of the velocity of fall are found in terms of the arithmetic mean value thereof, and the said mean value of the respective levels of the velocity of fall or the value of the deviation from the standard value of the velocity of fall is found, thereby control of the air flow to be blown through each air flow tuyere of the blast furnace, to put it otherwise, control of the air flow to be blown through a branch pipe, or control of the balance of fall of charges in the circumferential direction of the furnace by controlling the distribution of the charges for controlling the distribution of the charges from the top of the furnace, is conducted in a manner corresponding to the said deviation.

Figure 14:
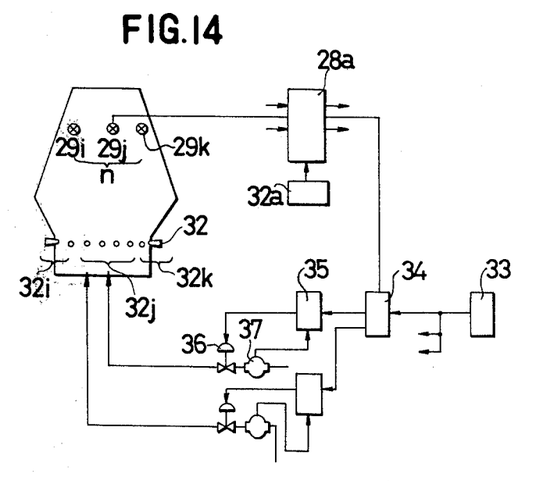
FIG. 14 is a diagram of the outline of heavy oil blowing control on the occasion of that the method introduced in the present invention is applied to a blast furnace.

Now, in the said control of the air flow to be blown through the branch pipe, either such a method of directly controlling the air flow to be blown through each tuyere, or such a method of controlling the flow of heavy oil to be blown through each tuyere, may be applied in a selective manner. To put it otherwise, the tuyere 32 is divided into an optional number of groups in the circumferential direction of the furnace, as shown in FIG. 14, and the magnetic sensor is arranged in place in an apportioned manner corresponding to respective groups. To put it in concrete terms, when the magnetic sensors and the groups tuyeres are arranged in a manner of corresponding to each other at the top and the bottom of the furnace, such a number of tuyere groups as are subject to respective mangetic sensors are constituted in a proper manner. That is to say, the magnetic sensors 29$i$, 29$j$, 29$k$ have such groups of tuyeres 32$i$, 32$j$, 32$k$ as are respectively corresponding thereto properly subjected thereto, and the groups of tuyeres 32$i$, 32$j$, 32$k$ become the object of control in a separate manner according to the respective results of detection thereby; however, in terms of the factor of time, the said groups of tuyeres are subjected to control concurrently in some case.

In FIG. 14, the velocity of fall in the vicinity of respective magnetometers is found by a signal arithmetic unit 28$a$ through the signals detected by the magnetic sensors 29$i$, 29$j$, 29$k$, and deviation from the mean velocity of fall in the circumferential direction of the furnace or the standard velocity of fall is found, then the deviation thus found is multiplied by such a coefficient of weight as is determined through the experience of actual operation and the like by the employment of a weight setter.

Figure 15:
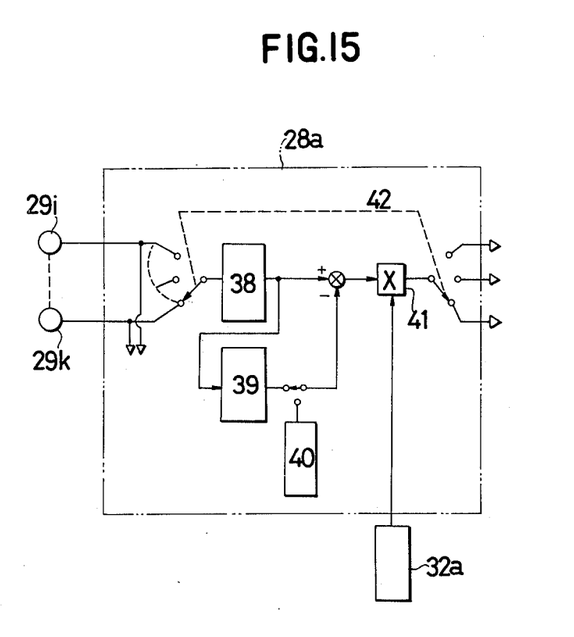
FIG. 15 is a block diagram of the arithmetic outline of the signal arithmetic unit employed for materializing the method introduced in the present invention.

Shown in FIG. 15 is an embodiment in details of the signal arithmetic unit 28$a$ shown in FIG. 14.

The signals generated by the magnetic sensors 29$i$, 29$j$, 29$k$ are switched over sequentially by a changeover switch 42, and each level of the velocity is found by the employment of a velocity arithmetic unit, that is to say, a reciprocal interrelation meter 38. Next, the arithmetic mean value of respective levels of velocity is found through a velocity averaging circuit 39, and deviation of the respective levels of velocity from either the said arithmetic mean value or the value of the output of such a standard velocity setter 40 as has the standard velocity of fall found through the said arithmetic mean value or an experimental value set therein is then found. In a multiplier 41, the value of the said deviation is multiplied by such a coefficient of weight as is obtained on the basis of the experience of operation from a weight setter 32a, and the level of control of the balance in the circumferential direction of the furnace, corresponding to each magnetometer, is thus found.

Now, the level of control of the balance in the circumferential direction of the furnace, found by the employment of the signal arithmetic unit 28a shown in FIG. 14, is put on the set value of the quantity of heavy oil to be blown for each group transmitted from a gross heavy oil blow quantity setter 33, by a group heavy oil blow quantity set value arithmetic unit 34, and an increase or a decrease in the quantity of heavy oil to be blown for each and every group is thus effected in an automatic manner. For instance, in case the velocity of fall measured by the magnetic sensor 29i of No. i is less than the mean velocity, the value of the balance control in the circumferential direction of the furnace becomes negative, and the quantity of heavy oil to be set by the group heavy oil blow quantity set value arithmetic unit 34 is decreased to the level below the standard value. For this reason, the quantity of the heavy oil to be blown through the tuyeres of the i group is automatically subjected to a decrease by the control units of the flow control meter 35, the control valve 36, and the flowmeter 37, for heavy oil, arranged at the tuyere. The decrease in the quantity of the heavy oil to be thus blown intensifies the combustion of the coke in front of the tuyere, and accelerates the reducing reaction by coke, which result in an increase in the velocity of fall of the charges in a gradual manner, and thereby a wanted rate of reaction in the furnace can be obtained in a satisfactory manner. The rate of fall of the charges and the reaction in the furnace can be properly controlled in such a manner as set forth above by adjusting the quantity of heavy oil to be blown, and a similar or even better effect can be achieved by controlling the quantities of such other additives as oxygen, steam, and so forth, either independently or jointly.

In case the ratio of the thickness of the layer of coke to that of iron ore in the vicinity of the wall of the furnace should deviate from the standard value or the mean value in the circumferential direction of the furnace, due to nonuniform fall of charges in the blast furnace, such can be properly detected as a fluctuation in, or a difference of, the thickness of the layer in the circumferential direction of the furnace; therefore, the blast furnace can be maintained in a stabilized state by causing the charges to be subjected to fall in a concentrated manner to such a spot wherein the said deviation has been formed, thereby recovering the ratio of iron ore to coke (termed O/C in an abbreviated form) to a wanted level of value.

A description of this control method will be given below in concrete terms by selecting as an example such a blast furnace as is provided with a well-known movable armor charging device. This control method can be likewise applied in the case of employing such other charging method as that by the well-known pole pulse charging device.

Figure 16:
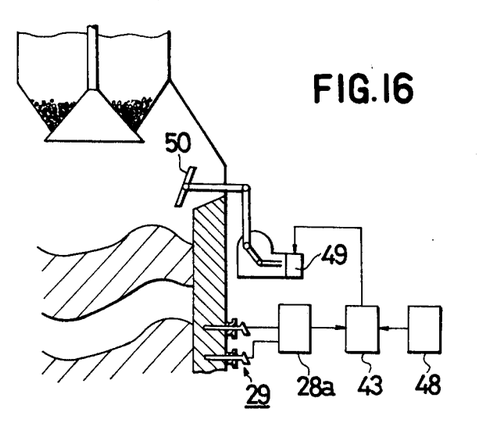
FIG. 16 is a diagram of the outline of control of distribution of charges at the top of the furnace on the occasion of that the method introduced in the present invention is applied to a blast furnace.
Figure 17:
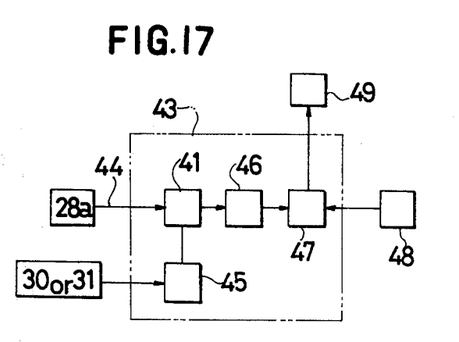
FIG. 17 is a block diagram of the outline of signal treatment for the control of distribution of charges.

In FIG. 16 and FIG. 17, the signal 44 of the velocity of fall of the charges in the vicinity of the detecting terminal is found from the output waveforms 30, 31 of the magnetic sensor 29, by the employment of a signal arithmetic unit 28a, in the wake thereof, the said signal 44 thus found and the length of the zero-crossing time of the output waveform found by the measuring instrument 45 are multiplied with each other in the control meter 43, thereby the thickness of the layer of ore and the thickness of the layer of coke can be found, respectively. The thickness of the layer of the ore and the thickness of the layer of the coke to be thus found in an alternate manner are converted into the ratio of layer thickness in a sequential manner by the employment of the O/C ratio arithmetic organ 46, the ratio of the layer thickness of the ore to that of the coke is calculated, the result of the calculation is compared with the output signal transmitted from the O/C setter 48 for setting the standard charging ratio of the ore to the coke, in the control section 47, and the deviation thus found has such control elements as proportion, differentiation, integration, and delay function thereon, thus forming proper control signals.

Shown in FIG. 17 is the detailed constitution of the movable armor adjusting meter 43 in connection with the outline of the signal processing thereby, and in this case the mean thickness of the layer in the circumferential direction of the furnace may be found and employed, in lieu of the said signal transmitted from the O/C setter 48. Now, the control signal made on the basis of the deviation of the ratio of the thickness of the layer of the ore to that of the coke from the standard value is applied on the armor driving and controlling terminal 49, converted into the driving force for the armour plate 50, and modifies the position of the armor plate 50. As a result of the modification of the position, now that the points of fall of the ore and the coke are changed, and correction of charging is conducted in such a manner that the O/C ratio conforms with the designated standard value, the ratio of the thickness of the layer of the charges in the circumferential direction of the furnace can be maintained on the level of the designated value.

On the other hand, the electric circuits as used in the embodiments of FIGS. 7 and 8 are, for example, disclosed in the co-pending application U.S. Ser. No. 618,679, now abandoned filed Oct. 1, 1975 by Kosuke Harada, Shinjiro Takeuchi, Satoshi Ichioka and Toshiro Kikuchi, which disclosure is hereby incorporated by reference.

In the invention introduced in the present application, the term of finding the level of control of the reaction in the furnace means finding the quantity of heavy oil, the quantity of oxygen to be added, the quantity of blast, the temperature of blast, the quantities of charges to be put in through the top of the furnace, and the level of control of distribution or charging ratio; and improvement of the reducing reaction in the furnace through the local control and the overall control of the above-mentioned items in the direction of the circumference of the furnace, thereby causing well-balanced reducing reaction to be conducted in the circumferential direction of the furnace, is termed exercise of control for balancing.

As elucidated in details in the preceding paragraphs, operation of a blast furnace, featuring a high level of reliability, is enabled to be conducted, wherefrom the productivity of the blast furnace can be enhanced a great deal, the conditions and the state of operation of the blast furnace can be kept stabilized, and, therefore, the life of the blast furnace can be prolonged a great deal.

What is claimed is:

1. In a method for detecting behavior of charges including velocity, thickness of layer and distribution of the charges, in a furnace such as a metallurgical furnace by sensing magnetic fluctuations due to movement and differences in magnetic characteristics of said charges by utilizing magnetic sensing means provided in walls of the furnace, the improvement comprising the steps of:

inserting at least one magnetic sensing section of a magnetometer and at least one magnetic field generating means having a forward end into at least one hole provided in the wall of the furnace in such a way that said magnetic sensing section precedes said magnetic field generating means into the wall, said forward end being an end of the magnetic field generating means positioned closer to said charges;

arranging said magnetic sensing section of said magnetometer in the vicinity of said forward end of said magnetic field generating means and along the central axis direction in which the magnetic field is generated so that said magnetic sensing section is positioned within said magnetic field, said magnetic sensing section being utilized under the condition in which it is not magnetically saturated by said magnetic field;

detecting fluctuations in a constituent of a vector of the magnetic field, said constituent being one having a direction which is the same as that of a magnetism detecting axis of the magnetic sensing section, said fluctuations being caused by movement of the charges and differences in the permeability of said charges; and treating output signals of said magnetic sensing section by utilizing a signal treatment circuit, said output signals occurring in response to said fluctuations which indicate the behavior of the charges.

2. The method of claim 1, wherein said behavior of the charges is detected by a plurality of the magnetic field generating means and magnetic sensing sections inserted into respective holes in said wall of said furnace in the circumferential and vertical directions thereof, wherein each magnetic sensing section is arranged in the vicinity of the forward end of its corresponding magnetic field generating means and is driven by a driving circuit corresponding thereto, and wherein output signals of said magnetic sensing sections are treated by said signal treatment circuit.

3. In a system for detecting the behavior of charges, including velocity, thickness of layer and distribution of the charges, in a furnace such as a metallurgical furnace by sensing magnetic fluctuations due to movement and differences in magnetic characteristics of said charges by utilizing magnetic sensing means provided in walls of the furnace, the improvement comprising;

at least one magnetic field generating means having a forward end for generating an exciting magnetic field, said forward end being an end of the magnetic field generating means positioned closer to said charges;

at least one magnetic sensing section being arranged along the direction in which said exciting magnetic field is generated, and being arranged in the vicinity of said forward end of the magnetic field generating means, for picking up, in the form of electrical signals, fluctuations in a constituent of a vector of said exciting magnetic field as are caused by movement of said charges within said furnace; said constituent being one having a direction which is the same as that of a magnetism detecting axis of the magnetic sensing section; said magnetic field generating means and said magnetic sensing section being inserted into at least one hole in the wall of said furnace in such a way that said magnetic sensing section precedes said magnetic field generating means into the wall of the furnace;

at least one driving circuit for driving said magnetic sensing section; and a signal treatment circuit for treating said electrical signals to detect the behavior of said charges through changes in said electrical signals.

4. The system of claim 3, wherein there are provided a plurality of magnetometers, each including a magnetic sensing section and a driving circuit, each magnetometer being inserted into a respective hole in the wall of said furnace in the circumferential and vertical directions thereof, each magnetic sensing section of the magnetometer being arranged in the vicinity of the forward end of its respective magnetic field generating means and being driven by said driving circuit, and wherein said signal treatment circuit receives all the electrical signals of all said magnetometers.

5. The system of claim 3, further comprising a power source, wherein said magnetic field generating means comprises a magnetic core and a coil, said coil being wound around said core and connected to said power source.

6. The system of claim 3, wherein said magnetic field generating means is a permanent magnet.

7. The system of claim 3, further comprising a magnetic sensing section which is arranged along the direction in which said exciting magnetic field is generated, and arranged in the vicinity of a rear end of the magnetic field generating means said rear end being an end of the magnetic field generating means positioned at a remote side with respect to said charges, wherein the magnetic sensing sections arranged in the vicinity of the forward end and the rear end of the magnetic field generating means are respectively connected in an electrically differential manner and connected to said signal treatment circuit.

8. The system of claim 3 wherein a magnetometer, which includes said magnetic sensing section and said driving circuit, is inserted into said hole, said wall being formed by a sheet iron shell and brick, and wherein said hole is drilled through said wall in the direction toward the core of the furnace.

9. The system of claim 7, wherein said driving circuit is arranged in the vicinity of said rear end of the magnetic field generating means.

10. The system of claim 3, and further comprising an indicator circuit for indicating an output of said signal treatment circuit.

11. The system of claim 4, wherein a couple of said magnetometers are inserted into respective holes in the wall of the furnace, said holes being spaced from each other in a vertical direction of the furnace.

12. The system of claim 4, wherein said furnace is a blast furnace, and wherein fluctuations in charges selected for use in said blast furnace in the circumferential and vertical directions of the blast furnace are detected.

13. The system of claim 3, wherein said driving circuit includes a single transistor type magnetic oscillating circuit.

14. The system of claim 3, wherein said driving circuit includes a two transistor type magnetic oscillating circuit.

* * * * *